United States Patent
Fujinami et al.

(10) Patent No.: US 6,484,233 B1
(45) Date of Patent: Nov. 19, 2002

(54) REPRODUCING APPARATUS AND METHOD, PROGRAM OFFERING MEDIUM AND STORAGE MEDIUM

(75) Inventors: Yasushi Fujinami, Tokyo (JP); Toshiya Hamada, Saitama (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/294,662

(22) Filed: Apr. 19, 1999

(30) Foreign Application Priority Data

Apr. 21, 1998 (JP) .......................................... 10-110371

(51) Int. Cl.[7] .............................................. G06F 12/00
(52) U.S. Cl. ............................ 711/111; 711/154; 710/14
(58) Field of Search .......................... 710/14; 711/111, 711/112, 114, 154, 162, 165

(56) References Cited

U.S. PATENT DOCUMENTS

| | | | | |
|---|---|---|---|---|
| 5,712,738 A | * | 1/1998 | Kotabe et al. ................. | 360/15 |
| 5,829,044 A | * | 10/1998 | Sono ........................... | 711/154 |
| 5,915,263 A | * | 6/1999 | Maeda ..................... | 369/275.3 |
| 6,233,654 B1 | * | 5/2001 | Aoki et al. ................. | 369/30.4 |
| 6,330,644 B1 | * | 12/2001 | Yamashita et al. .......... | 345/541 |
| 6,332,182 B1 | * | 12/2001 | Geldman et al. ........... | 711/112 |

* cited by examiner

*Primary Examiner*—Matthew Kim
*Assistant Examiner*—C. P. Chace
(74) *Attorney, Agent, or Firm*—Frommer Lawrence & Haug LLP; William S. Frommer; Dennis M. Smid

(57) ABSTRACT

In order to make it possible to control titles separately or continuously, title_playback_mode_flag is recorded on an optical disk. When this flag is "1," the CPU of a system controller, when the reproduction of one title on the optical disk has ended, continues to have the next title reproduced. When this flag is "0," the CPU, when the reproduction of one title has ended, causes reproduction to be discontinued then.

8 Claims, 24 Drawing Sheets

FIG. 2

| Syntax | Number of Bits | Mnemonic |
|---|---|---|
| VOLUME. TOC{ | | |
|     file_type_id | 8*16 | char[16] |
|     voleme_information() | | |
|     text_block() | | |
| } | | |

FIG. 3

| Syntax | Number of Bits | Mnemonic |
|---|---|---|
| VOLUME. TOC{ | | |
|     volume_information(){ | | |
|     volume_attribute() | | |
|     resume() | | |
|     volume_rating() | | |
|     write_protect() | | |
|     play_protect() | | |
|     recording_timer() | | |
| } | | |

FIG. 4

| Syntax | Number of Bits | Mnemonic |
|---|---|---|
| volume_attribute(){ | | |
|     volume_attribute_length | 32 | unimsdf |
|     vdr_version | 4*4 | bcd |
|     reserved | 6 | bslbf |
|     title_playback_mode_flag | 1 | bslbf |
|     program_playback_mode_flag | 1 | bslbf |
|     volume_play_time() | 4*8 | bcd |
|     update_time_count() | 32 | uimsbf |
|     maker_id | 8*16 | char[16] |
|     model_code | 8*16 | char[16] |
|     POSID | 32 | bslbf |
| } | | |

FIG.5

| Syntax | Number of Bits | Mnemonic |
|---|---|---|
| resume (){ | | |
|     resume_length | 32 | uimsbf |
|     reserved    //for byte alignment | 3 | bslbf |
|     resume_switch | 1 | bit |
|     reserved | 4 | bslbf |
|     number_of_records | 4 | uimsbf |
|     reserved    //for byte alignment | 7 | bslbf |
|     resume_auto_execute_time_flag | 1 | bit |
|     resume_auto_execute_time_() | 4*14 | bcd |
|     reserved | 4 | bslbf |
|     resume_auto_execute_record_number | 4 | uimsbf |
|     for(i=0;<number_of_records;i++){ | | |
|         resume_mode_flag | 4 | bslbf |
|         object_type | 4 | bslbf |
|         linked_record_number | 4 | uimsbf |
|         number_of_times | 16 | uimsbf |
|         resume_updated_time() | 4*14 | bcd |
|         switch(object_type){ | | |
|             case title: | | |
|                 title_number | 16 | uimsbf |
|                 title_local_time_stamp | 64 | uimsbf |
|                 break; | | |
|             case program: | | |
|                 program_number | 16 | uimsbf |
|                 program_local_time_stamp | 64 | uimsbf |
|                 break; | | |
|             case program_bind | | |
|                 program_bind_number | 16 | uimsbf |
|                 program_ordre | 16 | uimsbf |
|                 program_number | 16 | uimsbf |
|                 program_local_time_stamp | 64 | uimsbf |
|                 break; | | |
|             case play_item: | | |
|                 play_item_number | 16 | uimsbf |
|                 play_item_local_time_stamp | 64 | uimsbf |
|                 break | | |
|             } | | |
|         } | | |
|     } | | |

FIG.6

| Syntax | Number of Bits | Mnemonic |
|---|---|---|
| volume_rating() | | |
|     volume_rating_length | 32 | uimsbf |
|     reserved | 6 | bslbf |
|     volume_rating_type | 2 | bslbf |
|     volume_rating_password | 128 | bslbf |
|     switch(rating_type) { | | |
|         case ago_limited | | |
|             country_code_for_rating | 32 | bslbf |
|             for(i=;i<32;i++) { | | |
|                  rating_bit_for_ago_limited | 1 | bslbf |
|             break; | | |
|         case CARA: | | |
|             CARA_category | 4 | bslbf |
|             reserved | 4 | bslbf |
|             reserved | 16 | bslbf |
|             break; | | |
|         case RSAC: | | |
|             RSAC_category | 4 | bslbf |
|             level | 4 | bslbf |
|             reserved | 16 | bslbf |
|             break; | | |
|     } | | |
| } | | |

FIG.7

| Syntax | Number of Bits | Mnemonic |
|---|---|---|
| write_protect() | | |
|     write_protect_length | 32 | uimsbf |
|     volume_write_protect_level | 4 | uimsbf |
|     password_enable_flag | 1 | bslbf |
|     apped_only_flag | 1 | bslbf |
|     expiration_time_enable_flag | 1 | bslbf |
|     number_of_times_enable_flag | 1 | bslbf |
|     password_for_volume_write_protect() | 128 | bslbf |
|     reserved | 8 | bslbf |
|     write_protect_set_time() | 56 | bcd |
|     reserved | 8 | bslbf |
|     write_protect_expirartion_time() | 56 | bcd |
|     number_of_times | 16 | uimsbf |
| } | | |

FIG. 8

| Syntax | Number of Bits | Mnemonic |
|---|---|---|
| play_protect() { | | |
|     play_protect_length | 32 | uimsbf |
|     volume_play_protect_flag | 2 | bslbf |
|     reserved | 2 | bslbf |
|     password_enable_flag | 1 | bslbf |
|     reserved | 1 | bslbf |
|     expiration_time_enable_flag | 1 | bslbf |
|     number_of_times_enable_flag | 1 | bslbf |
|     password_for_volume_play_protect | 128 | bslbf |
|     rederved | 8 | bslbf |
|     play_protect_set_time() | 56 | bcd |
|     rederved | 8 | bslbf |
|     play_protect_expiration_time() | 56 | bcd |
|     number_of_times | 16 | uimsbf |
| } | | |

FIG. 9

| Syntax | Number of Bits | Mnemonic |
|---|---|---|
| recording_timer() { | | |
|     recording_timer_length | | |
|     recording_timer_flag | | |
|     number_of_entry | | |
|     for(i=0;i<number_of_entry;i++){ | | |
|         date_and_time | | |
|         channel | | |
|         program | | |
|         : | | |
|     } | | |
| } | | |

FIG. 10

| Syntax | Number of Bits | Mnemonic |
|---|---|---|
| text_block(){ | 32 | uimsbf |
|     text_block_length | 8 | uimsbf |
|     number_of_language_sets | 16 | uimsbf |
|     number_of_text_items | | |
|     for(i=0;I<number_of_language_sets;i++){ | | |
|         language_set() | | |
|     } | | |
|     for(i=0;i<number_of_text_items;i++){ | | |
|         text_item() | | |
|     } | | |
| } | | |

FIG. 11

| Syntax | Number of Bits | Mnemonic |
|---|---|---|
| language_set(){ | | |
|     reserved | 8 | bslbf |
|     language_code | 24 | bslbf |
|     number_of_language_set_names | 8 | uimsbf |
|     for(i=0;i<number_of_language_set_names;i++){ | | |
|         character_set_type | 8 | bslbf |
|         language_set_name_length | 8 | uimsbf |
|         language_set_name | 8*language_set_name_length | bslbf |
|     } | | |
| } | | |

FIG.12

| Syntax | Number of Bits | Mnemonic |
|---|---|---|
| text_item(){ | 16 | uimsbf |
|     text_block_length | 16 | uimsbf |
|     text_item_id | 16 | uimsbf |
|     text_item_sub_id | 8 | bslbf |
|     flags | 8 | uimsbf |
|     number_of_used_language_sets | | |
|     // loop for each language set | | |
|     for(i=0;i<number_of_used_language. | 8 | uimsbf |
|         language_set_id | 4 | bslbf |
|         reserved | 16 | uimsbf |
|         text_string_length | | bslbf |
|         text_string | 8*text_string_length | |
|         bitman() | | |
|     } | | |
|     stuffing_bytes | 8n* | bslbf |
| } | | |

FIG.13

| Syntax | Number of Bits | Mnemonic |
|---|---|---|
| ALBUM. STR{ | | |
|     file_type_id | 8*16 | char[16] |
|     album() | | |
|     text_block() | | |
| } | | |

F I G . 14

| Syntax | Number of Bits | Mnemonic |
|---|---|---|
| album (){ | | |
|    album_length | 32 | uimsbf |
|    reserved | 6 | bslbf |
|    volume_status | 1 | bslbf |
|    if(volume_status--"1b"){ | | |
|      chief_volume_flag | 1 | bslbf |
|    }else{ | | |
|      reserved | 1 | "0" |
|    } | | |
|    if(volume_status=="1b"){ | | |
|      if(chief_volume_flag=="1b"){ | | |
|        reserved | 6 | bslbf |
|        album_type | 2 | bslbf |
|        album id | 128 | bslbf |
|        number_of_discs_in_album | 16 | uimsbf |
|        number_of_volumes_in_album | 16 | uimsbf |
|        for(i=0;i<number_of_volumes_in_album;i++){ | | |
|          disc_id_for_album_member | 128 | bslbf |
|          volume_id_for_album_member | 128 | bslbf |
|          title_offset_number | 16 | uimsbf |
|        } | | |
|        reserved_for_program_bind | 8 | bslbf |
|        number_of_program_binds | 8 | uimsbf |
|        for(i=0;i<number_of_program_in_this_program_binds;i++){ | | |
|          disc_id_for_program_bind_member | 16 | uimsbf |
|          volume_id_for_program_bind_number | 128 | uimsbf |
|          disc_id_for_program_bind_member | 128 | uimsbf |
|          program_number | 16 | uimsbf |
|        } | | |
|      }else{     // chief_volume_flag--"0b" | | |
|        chief_disc_id | 128 | uimsbf |
|        chief_volume_id | 128 | uimsbf |
|        (album_id | 128 | bslbf |
|      } | | |
|    } | | |
| } | | |

F I G. 15

| Syntax | Number of Bits | Mnemonic |
|---|---|---|
| TITLE_###.VDR{ | | |
|     file_type_id | 8*16 | char[16] |
|     title_info() | | |
|     text_block() | | |
| } | | |

F I G. 16

| Syntax | Number of Bits | Mnemonic |
|---|---|---|
| title_info(){ | | |
|     title_info_length | 32 | uimsbf |
|     flags_for_title | 32 | bslbf |
|     cgit_file_id | 16 | uimsbf |
|     title_start_chunk_group_time_stamp | 64 | uimsbf |
|     title_end_chunk_group_time_stamp | 64 | uimsbf |
|     title_playback_time() | 32 | bcd |
|     reserved | 32 | bslbf |
|     number_of_marks | 16 | uimsbf |
|     for(i=0;i<number_of_marks;i++){ | | |
|         reserved | 4 | bslbf |
|         mark_type | 4 | bslbf |
|         relative_time_stamp_in_title | 64 | uimsbf |
|     } | | |
|     stuffing_bytes | 8*n | bslbf |
| } | | |

F I G. 17

| Syntax | Number of Bits | Mnemonic |
|---|---|---|
| PROGRAM_$$$.PGI | | |
|     file_type_id | 8*16 | char[16] |
|     program() | | |
|     text_block() | | |
| } | | |

FIG. 18

| Syntax | Number of Bits | Mnemonic |
|---|---|---|
| program() { | | |
|     program_length | 32 | uimsbf |
|     flags_for_program | 32 | bslbf |
|     program_status | 4 | bslbf |
|     program_playback_time() | 32 | bcd |
|     reserved | 32 | bslbf |
|     number_of_play_sequences | 16 | uimsbf |
|     for(j=0;j<number_of_play_lists;k++) { | | |
|         number_of_play_lists | 16 | uimsbf |
|         for(k=0;k<number_of_play_lists;k++) { | | |
|             play_list_start_time_stamp_offset | 64 | uimsbf |
|             play_list(k) | | |
|         } | | |
|     } | | |
|     stuffing_bytes | 8*n | bslbf |
| } | | |

FIG. 19

| Syntax | Number of Bits | Mnemonic |
|---|---|---|
| play_list() { | | |
|     //playback sequence of play items in this play list | | |
|     number_of_play_items | 16 | uimsbf |
|     for(k=0;k<number_of_play_items;k++) { | | |
|         play_item_number | 16 | uimsbf |
|         reserved | 31 | bslbf |
|         seamless_connection_flag | 1 | bslbf |
|     } | | |
|     //play_item_table | | |
|     for(PIN=t;PIN<=number_of_play_items_in_program;PIN++) { | | |
|         play_item() | | |
|     } | | |
| } | | |

F I G. 20

| Syntax | Number of Bits | Mnemonic |
|---|---|---|
| play_item(){ | | |
|     play_item_length | 32 | uimsbf |
|     play_item_type | 8 | bslbf |
|     play_mode | 8 | bslbf |
|     total_playback_time () | 32 | bcd |
|     menu_item_number | 16 | uimsbf |
|     return_item_number | 16 | uimsbf |
|     next_item_number | 16 | uimsbf |
|     prev_item_number | 16 | uimsbf |
|     if(play_item_type="0000b") { | | |
|         // play item for one "cut" | | |
|         title_number | 16 | uimsbf |
|         // IN point | | |
|         item_start_time_stamp | 64 | uimsbf |
|         // OUT point | | |
|         item_end_time_.stamp | 64 | uimsbf |
|     } | | |
| } | | |

F I G. 21

| Syntax | Number of Bits | Mnemonic |
|---|---|---|
| CHUNKGROUP_###.CGIT{ | | |
|     file_type_id | 8*16 | char[16] |
|     chunkgroup_time_base_flags | 32 | bslbf |
|     chunkgroup_time_base_offset | 64 | uimsbf |
|     chunk_connection_info() | | |
|     text_block() | | |
| } | | |

FIG. 22

| Syntax | Number of Bits | Mnemonic |
| --- | --- | --- |
| chunk_connection_into() { | 32 | uimsbf |
|     chunk_connection_info_length | 16 | bslbf |
|     reserved | 16 | uimsbf |
|     number_of_chunks | 8 | bslbf |
|     chunk_sync_play_flag | | |
| | | |
|     //chunk info file list | | |
|     for(i=0;i<number_of_chunks;i++){ | | |
|         chunk_arrangement_info() | | |
|     } | | |
| } | | |

FIG. 23

| Syntax | Number of Bits | Mnemonic |
| --- | --- | --- |
| chunk_arrangement_info() { | | |
|     chunk_arrangement_info_length | 32 | uimsbf |
|     chunk_info_file_id | 16 | bslbf |
|     reserved | 5 | bslbf |
|     chunk_switch_stream_id | 16 | bslbf |
| | | |
|     presentation_start_cg_time_count | 64 | uimsbf |
|     presentation_end_cg_time_count | 64 | uimsbf |
| | | |
|     reserved | 4 | bslbf |
|     chunk_time_count_type | 4 | bslbf |
|     number_of_start_original_time_count_extension | 8 | uimsbf |
|     number_of_end_original_time_count_extension | 8 | uimsbf |
| | | |
|     //presentation start position and time | | |
|     presentation_start_original_time_count | 64 | uimsbf |
|     presentation_end_original_time_count | 64 | uimsbf |
| | | |
|     for(j=0;j<number_of_start_original_time_count_extension;j++) | | |
|         tc_ext_attributes | 16 | bslbf |
|         start_original_time_count_extension | 64 | uimsbf |
|     } | | |
| | | |
|     //presentation end position and time | | |
|     for(k=0; <number_of_end_original_time_count_extension;k++){ | | |
|         tc_ext_attributes | 16 | bslbf |
|         end_original_time_count_extension | 64 | uimsbf |
|     } | | |
|     transition_info() | | |
| } | | |

FIG. 24

| Syntax | Number of Bits | Mnemonic |
|---|---|---|
| CHUNK _%%%. ABST{ | | |
|     file_type_id | 8* 16 | char[16] |
|     reserved | 4 | bslbf |
|     chunk_file_id | 16 | uimsbf |
|     info_type | 4 | bslbf |
|     // stream_info () | | |
| | | |
|     if(info_type=="MPEG2_System_TS") { | | |
|         number_of_programs | 8 | uimsbf |
|     else { | | |
|         number_of_programs | 8 | "0000 0001" |
|     } | | |
|     for(i=0;i<number<of_programs;i++){ | | |
|         number_of_streams | 8 | uimsbf |
|         for(i=0;i<number_of_streams | | |
|             stream_identifier | 8 | bslbf |
| | | |
|         // slot type information | | |
|         reserved | 4 | bslbf |
|         slot_unit_type | 4 | bslbf |
|         if(slot_unit_type=="time_stamp") { | | |
|             slot_time_length | 32 | uimsbf |
|         } else { | | |
|             reserved | 32 | bslbf |
|         } | | |
|         number_of_slots | 32 | uimsbf |
|         reserved | 4 | bslbf |
|         switch(info_type){ | | |
|             case MPEG1_System: | | |
|             case MPEG2_System_PS: | | |
|             case MPEG2_System_TS: | | |
|             case video_elementary_stream | | |
|                 number_of_i_pictures_in_a_slot | 4 | uimsbf |
|                 break | | |
|             default: | | |
|                 reserved | 4 | bslbf |
|                 break; | | |
|             default: | | |
|         } | | |
|         // stream attribute | | |
|         ES_attribute() | | |
|     } | | |
|     // loop of slot info | | |
|     for(i=0;i<number_of_streams;i++){ | | |
|         for(i=0;i<number_of_slots;i++){ | | |
|             slot_info () | | |
|         } | | |
|     } | | |
|     } | | |
| } | | |

FIG.26

```
/----VOLUME. TOC
    -ALBUM. STR
    -PROGRAM
    |      -PROGRAM_001. PGI
    -TITLE
    |      -TITLE_001. VDR
    |      -TITLE_002. VDR
    |      -TITLE_003. VDR
    |
    -CHUNKGROUP
    |      -CHUNKGROUP_001. CGIT
    |      -CHUNKGROUP_002. CGIT
    |
    -CHUNK
    |      -CHUNK_0001. ABST
    |      -CHUNK_0011. ABST
    |      -CHUNK_0012. ABST
    |
    -MPEGAV
    |      -STREAMS_001
    |      |      -CHUNK_0001. MPEG2
    |      |
    |      -STREAMS_002
    |      |      -CHUNK_0011. MPEG2
    |      |      -CHUNK_0012. MPEG2
```

FIG. 29

```
/------MPEGAV
|       -STREAMS_003
|       |   -CHUNK_0031.MPEG2
```

FIG. 30

```
/---VOLUME.TOC
   -ALBUM.STR
   -PROGRAM
   |    -PROGRAM_001.PGI
   -TITLE
   |    -TITLE_001.VDR
   |    -TITLE_002.VDR
   |    -TITLE_003.VDR
   |    -TITLE_004.VDR*
   |
   -CHUNKGROUP
   |    -CHUNKGROUP_001.CGIT
   |    -CHUNKGROUP_002.CGIT
   |    -CHUNKGROUP_003.CGIT*
   |
   -CHUNK
   |    -CHUNK_0001.ABST
   |    -CHUNK_0011.ABST
   |    -CHUNK_0012.ABST
   |    -CHUNK_0031.ABST*
   |
   -MPEGAV
        -STREAMS_001
        |    -CHUNK_0001.MPEG2
        |
        -STREAMS_002
        |    -CHUNK_0011.MPEG2
        |    -CHUNK_0012.MPEG2
        |
        -STREAMS_003*
        |    -CHUNK_0031.MPEG2*
        |
```

FIG. 32

```
/------MPEGAV
 |        -STREAMS_002
 |        |    -CHUNK 0031.MPEG2
```

FIG. 33

```
/----VOLUME. TOC
    -ALBUM. STR
    -PROGRAM
    |      -PROGRAM_001. PGI
    -TITLE
    |      -TITLE_001. VDR
    |      -TITLE_002. VDR
    |      -TITLE_003. VDR
    |      -TITLE_004. VDR*
    |
    -CHUNKGROUP
    |      -CHUNKGROUP_001. CGIT
    |      -CHUNKGROUP_002. CGIT
    |
    -CHUNK
    |      -CHUNK_0001. ABST
    |      -CHUNK_0011. ABST
    |      -CHUNK_0012. ABST
    |      -CHUNK_0031. ABST*
    |
    -MPEGAV
    |      -STREAMS_001
    |      |        -CHUNK_0001. MPEG2
    |      |
    |      -STREAMS_002
    |      |        -CHUNK_0011. MPEG2
    |      |        -CHUNK_0012. MPEG2
    |      |        -CHUNK_0031. MPEG2*
```

| title_playback_mode_flag | Meaning |
|---|---|
| 0b | single play mode |
| 1b | continuous play mode |

| program_playback_mode_flag | Meaning |
|---|---|
| 0b | single play mode |
| 1b | continuous play mode |

REPRODUCING APPARATUS AND METHOD, PROGRAM OFFERING MEDIUM AND STORAGE MEDIUM

BACKGROUND OF THE INVENTION

FIELD OF THE INVENTION

The present invention relates to a reproducing apparatus and method, a program offering medium and a storage medium, and more particularly to a reproducing apparatus and method, a program offering medium and a storage medium which enable the user to accomplish reproduction in an unrestricted, variegated manner.

Recently, disks are attracting keen note as storage media for recording video information and the like to replace magnetic tapes. Magnetic tapes, which do not permit random access, are suitable for recording and reproducing video information only consecutively.

As opposed to them, disks permit ready random access, and accordingly enable any desired part of video information, even if it is recorded consecutively with other parts, in any desired sequence.

However, if a prescribed portion of information recorded on a disk is to be reproduced in any sequential position, the sequence of reproduction has to be stored in the reproducing apparatus. As a result, if the disk is to be played back on another reproducing apparatus, that other reproducing apparatus has to be taught and caused to store the sequence of reproduction anew, which meant corresponding inconvenience in operation.

SUMMARY OF THE INVENTION

The present invention has been proposed in view of this circumstance, and is intended to achieve improved operating convenience.

According to one aspect of the invention, a reproducing apparatus comprises a reproducing means for reproducing information recorded on a storage medium, an extracting means for extracting playback mode information defining a playback mode from the information reproduced by the reproducing means, and a control means responsive to the playback mode information extracted by the extracting means for controlling the reproduction continuity of main information from the storage medium.

According to another aspect of the invention, a reproducing method comprises a reproducing step to reproduce information recorded on a storage medium, an extracting step to extract playback mode information defining a playback mode from the information reproduced at the reproducing step, and a control step responsive to the playback mode information extracted at the extracting step to control the reproduction continuity of main information from the storage medium.

According to still another aspect of the invention, a program offering medium offers a program to cause a reproducing apparatus for reproducing information recorded on a storage medium to execute processes comprising a reproducing step to reproduce information recorded on the storage medium, an extracting step to extract playback mode information defining a playback mode from the information reproduced at the reproducing step, and a control step responsive to the playback mode information extracted at the extracting step to control the reproduction continuity of main information from the storage medium.

According to yet another aspect of the invention, a storage medium records thereon playback mode information in accordance with which, when the reproduction of a prescribed part of main information has been completed, either another part of main information continues to be reproduced or reproduction is discontinued.

The reproducing apparatus, the reproducing method and the program offering medium referred to above are responsive to the playback mode information reproduced from the storage medium for controlling the reproduction continuity of main information.

The storage medium described above has recorded thereon in advance playback mode information in accordance with which, when the reproduction of a prescribed part of main information has been completed, either another part of main information continues to be reproduced or reproduction is discontinued.

BRIEF DESCRIPTION OF THE DRAWINGS

Other objects and advantages of the present invention will be apparent from the following detailed description of preferred embodiments thereof when taken in conjunction with the accompanying drawings, in which:

FIG. 2 is a diagram for explaining VOLUME.TOC;

FIG. 3 is a diagram for explaining volume_information ( );

FIG. 4 is a diagram for explaining volume_attribute ( );

FIG. 5 is a diagram for explaining resume ( );

FIG. 6 is a diagram for explaining volume_rating ( );

FIG. 7 is a diagram for explaining write_protect ( );

FIG. 8 is a diagram for explaining play_protecto ( );

FIG. 9 is a diagram for explaining recording_timer ( );

FIG. 10 is a diagram for explaining text_block ( );

FIG. 11 is a diagram for explaining language_seto ( );

FIG. 12 is a diagram for explaining text_item ( );

FIG. 13 is a diagram for explaining ALBUM.STR;

FIG. 14 is a diagram for explaining album ( );

FIG. 15 is a diagram for explaining TITLE_###.VDR;

FIG. 16 is a diagram for explaining title_info ( );

FIG. 17 is a diagram for explaining program_$$$. PGI;

FIG. 18 is a diagram for explaining program ( );

FIG. 19 is a diagram for explaining play_list ( );

FIG. 20 is a diagram for explaining play_item ( );

FIG. 21 is a diagram for explaining CHUNKGROUP_###.CGIT;

FIG. 22 is a diagram for explaining chunk_connection_info ( );

FIG. 23 is a diagram for explaining chunk_arrangement_info ( );

FIG. 24 is a diagram for explaining CHUNK_%%%%.ABST;

FIG. 26 is a diagram for explaining the structure of a directory;

FIG. 29 is a diagram for explaining the structure of a directory;

FIG. 30 is a diagram for explaining the structure of a directory;

FIG. 32 is a diagram for explaining the structure of a directory;

FIG. 33 is a diagram for explaining the structure of a directory;

DESCRIPTION OF THE PREFERRED EMBODIMENTS

Preferred embodiments of the present invention will be described below. In the following, characteristics of the invention will be described with reference to the corresponding embodiment (only one example) in parentheses after each means cited to make clear the correspondence between each means of the invention as stated in the pertinent claim and its counterpart in the preferred embodiment. However, this is nothing to suggest that the present invention is limited to the means described hereinafter.

A reproducing apparatus according to one aspect of the invention is characteristic in that it comprises a reproducing means (e.g. an optical head 2 in FIG. 25) for reproducing information recorded on a storage medium, an extracting means (e.g. step S15 in FIG. 38) for extracting playback mode information defining a playback mode from the information reproduced by the reproducing means, and a control means (e.g. steps S16 and S19 in FIG. 38) responsive to the playback mode information extracted by the extracting means for controlling the reproduction continuity of main information from the storage medium.

A reproducing apparatus according to another aspect of the invention is characteristic in that the storage medium is capable of recording and reproduction, and is further provided with a recording means (e.g. the optical head 2 in FIG. 25) for recording playback information on the storage medium.

Figure 1:
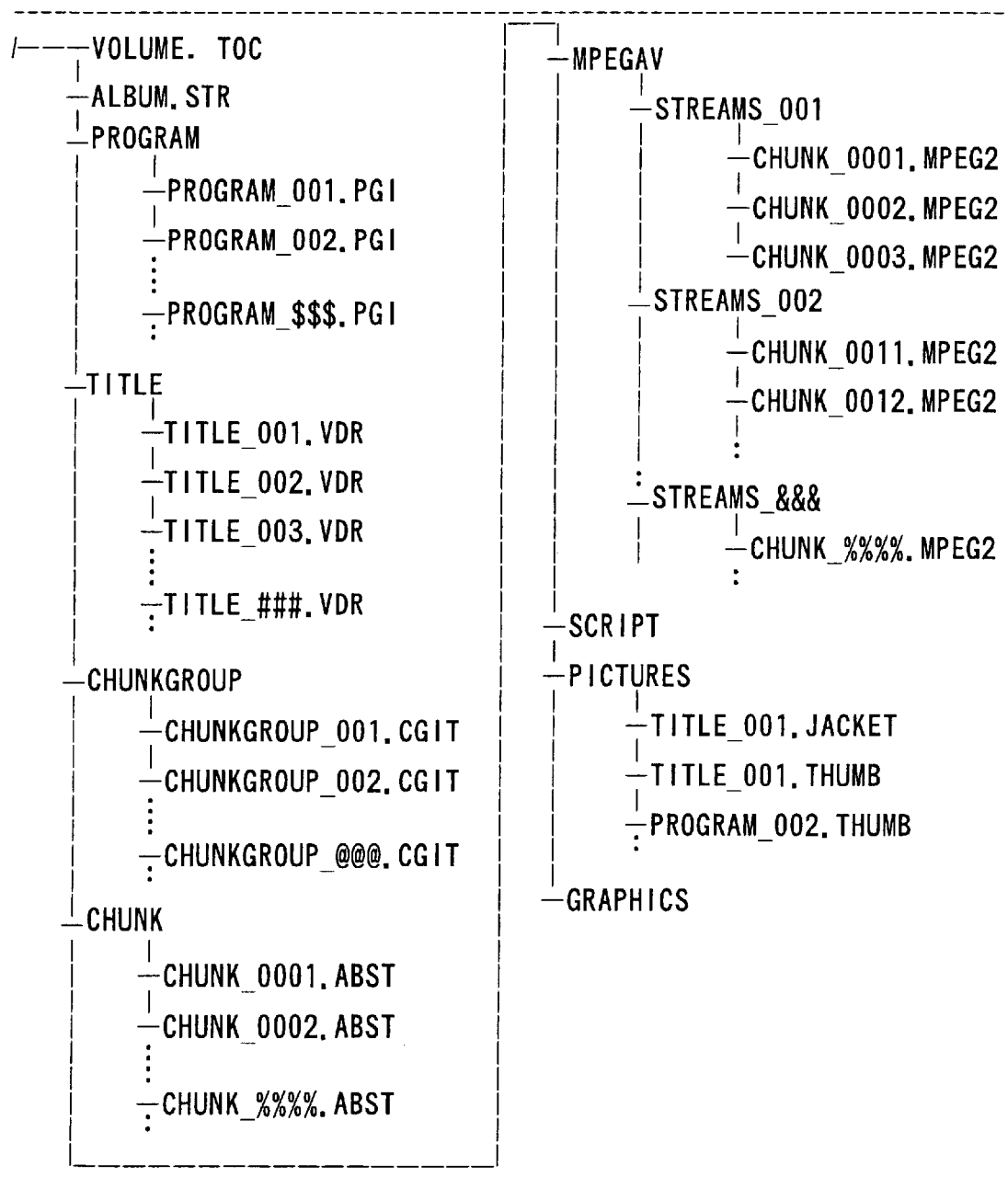
FIG. 1 is a diagram for explaining the structure of a directory.

File allocation on a storage medium (media) onto or from which information is recorded or reproduced according to the invention will be explained first. As illustrated in FIG. 1, the following seven kinds of files are recorded on the medium.

VOLUME.TOC
    ALBUM.STR
    PROGRAM_$$$.PGI
    TITLE_###.VDR
    CHUNKGROUP_@@@.CGIT
    CHUNK_%%%%.ABST
    CHUNK_%%%%.MPEG2

The files VOLUME.TOC and ALBUM.STR are placed in a root directory. Further, "PROGRAM_$$$.PGI" ("$$$" here represents a program number) is placed in the directory "PROGRAM" immediately under the root directory. Similarly, "TITLE_###. VDR" ("###" here represents a title the directory "TITLE" immediately under the root directory, while "CHUNKGROUP_@@@.CGIT" ("@@@" here represents a chunk group number) and "CHUNK_%%%%.ABST" ("%%%%" here represents a chunk number) are respectively placed in the directory "CHUNKGROUP" and in the directory "CHUNK".

One or more sub-directories are further generated in the MPEGAV directory immediately under the root directory, and thereunder "CHUNK_%%%%.ABST" ("%%%%" here represents a chunk number) is placed.

Usually, there is only one VOLUME.TOC file on a medium. However, a plurality of VOLUME.TOC files may be present in a medium of a specific structure, such as a medium of a hybrid ROM-RAM structure. This file is used to indicate the overall character of the medium.

VOLUME.TOC is structured as shown in FIG. 2. Placed first is file_type_id, indicating that the relevant file is VOLUME.TOC. It is followed by volume_information ( ) and finally comes text_block.

FIG. 3 illustrates the configuration of volume_information ( ). This area includes volume_attribute ( ), resume ( ), volume_rating ( ), write_protect ( ), play_protect ( ) and recording_timer ( ).

The volume_attribute ( ) area is provided to record the attributes of the logical volume, and its detailed structure is shown in FIG. 4. As illustrated there, this area includes title_playback_mode_flag and program_playback_mode_flag.

The resume ( ) area is intended to record information for restoring the state immediately before ejection, and its detailed structure is illustrated in FIG. 5.

The volume_rating ( ) area in FIG. 3 is intended to record information for the accomplishment of age restriction of the viewers for the whole volume according to the age and category, and its detailed structure is shown in FIG. 7.

The play_protect ( ) area in FIG. 3 is provided to record information for setting permission or prohibition regarding titles and programs recorded in the volume or limiting the frequency of reproduction, and its detailed structure is illustrated in FIG. 8.

The recording_timer area in FIG. 3 is intended to record information for controlling the recording time, and its detailed structure is shown in FIG. 9.

The detailed structure of text_block (of VOLUME.TOC in FIG. 2 is illustrated in FIG. 10. This text_block area includes language_set and text_item, whose detailed structures are shown in FIGS. 11 and 12, respectively.

There i s usually only one ALBUM.STR file, shown in FIG. 1, on a medium. However, a plurality of ALBUM.STR files may be present in a medium of a specific structure, such as a medium of a hybrid ROM-RAM structure. This file is used to combine a plurality of medium into a structure in which they look as if they were a single medium.

The structure of this ALBUM.STR is illustrated in FIG. 13. First comes file_type_id to indicate that the file is ALBUM.STR. It is followed by album ( ), and last comes text_block.

The album ( ) area is intended to record information for treating a plurality of volumes (a plurality of media) as one aggregate, and its detailed structure is shown in FIG. 14.

There are as many TITLE_###.VDR files of FIG. 1 as titles. A title refers to, for instance, one number on a compact disc or one program of television broadcast. The structure of this information is illustrated in FIG. 15. First place is the file_type_id area, which indicates that the relevant file is TITLE_###.VDR. Next comes title_infor ( ), and last comes text_block ( ), ### representing a character sequence indicating the title number.

The title_info ( ) area is for recording the attributes of a title, including its start point and end point, on the chunkgroup. Its detailed structure is shown in FIG. 16.

There are as many PROGRAM_$$$.PGI files of FIG. 1 as programs. A program consists of a plurality of cuts designating a part (or the whole) of the area of a title, and individual cuts are reproduced in a specified sequence. The structure of information is shown in FIG. 17. First placed is file_type_id, indicating that the relevant file is PROGRAM_$$$.PGI. Next comes programs ( ), followed by text_block ( ) as the final area, $$$ representing a character sequence indicating the title number.

The program ( ) are a is intended for recording information which is needed for collecting and reproducing necessary parts of a title without subjecting the raw material to irreversible editing. Its detailed structure is illustrated in FIG. 18.

The program ( ) area in FIG. 18 has one play_list. Details of this play_list ( ) are shown in FIG. 19.

The play_list area includes a plurality of play_item areas, whose details are illustrated in FIG. 10.

There are as many CHUNKGROUP_@@@.CGIT files of FIG. 1 as chunkgroups. A chunkgroup is a data structure for arranging a bit stream. This file is not recognized by the user as long as the user is normally operating an apparatus for recording onto or reproduction from a medium, such as a video disc recorder (VDR).

The structure of this information is shown in FIG. 21. First placed is the file_type_id area, indicating that the relevant file is CHUNKGROUUP_@@.CGIT. Next come chunkgroup_time_base_flags and chunkgroup_time_base_offset, followed by chunk_connection_info ( ), and last comes text_block.

The chunkgroup_time_base_flags area indicates a flag concerning the reference counter of the chunkgroup, while the chunkgroup_time_base_offset area indicates the start time of the reference time axis. This is a counter to be set in a counter counting up at 90 kHz, and has a size of 32 bits. The chunk_connection_info ( ) area is provided to store information on unique points, including the switching point of video and synchronism between video and audio, and its detailed structure is illustrated in FIG. 22.

This chunk_connection_info ( ) has as many chunk_arrangement_info ( ) loops as chunks belonging to the chunkgroup. FIG. 23 illustrates details of this chunk_arrangement_info ( ).

There are as many CHUNK_%%%%.ABST of FIG. 1 as chunks. A chunk is an information file corresponding to one stream file. The structure of information is shown in FIG. 24. First placed is file_type_id, indicating that the relevant file is CHUNK_%%%%.ABST.

The CHUNK_%%%%.MPEG2 of FIG. 1 is a stream file. This file stores the bit stream of MPEG, unlike other files which record solely information.

Figure 25:
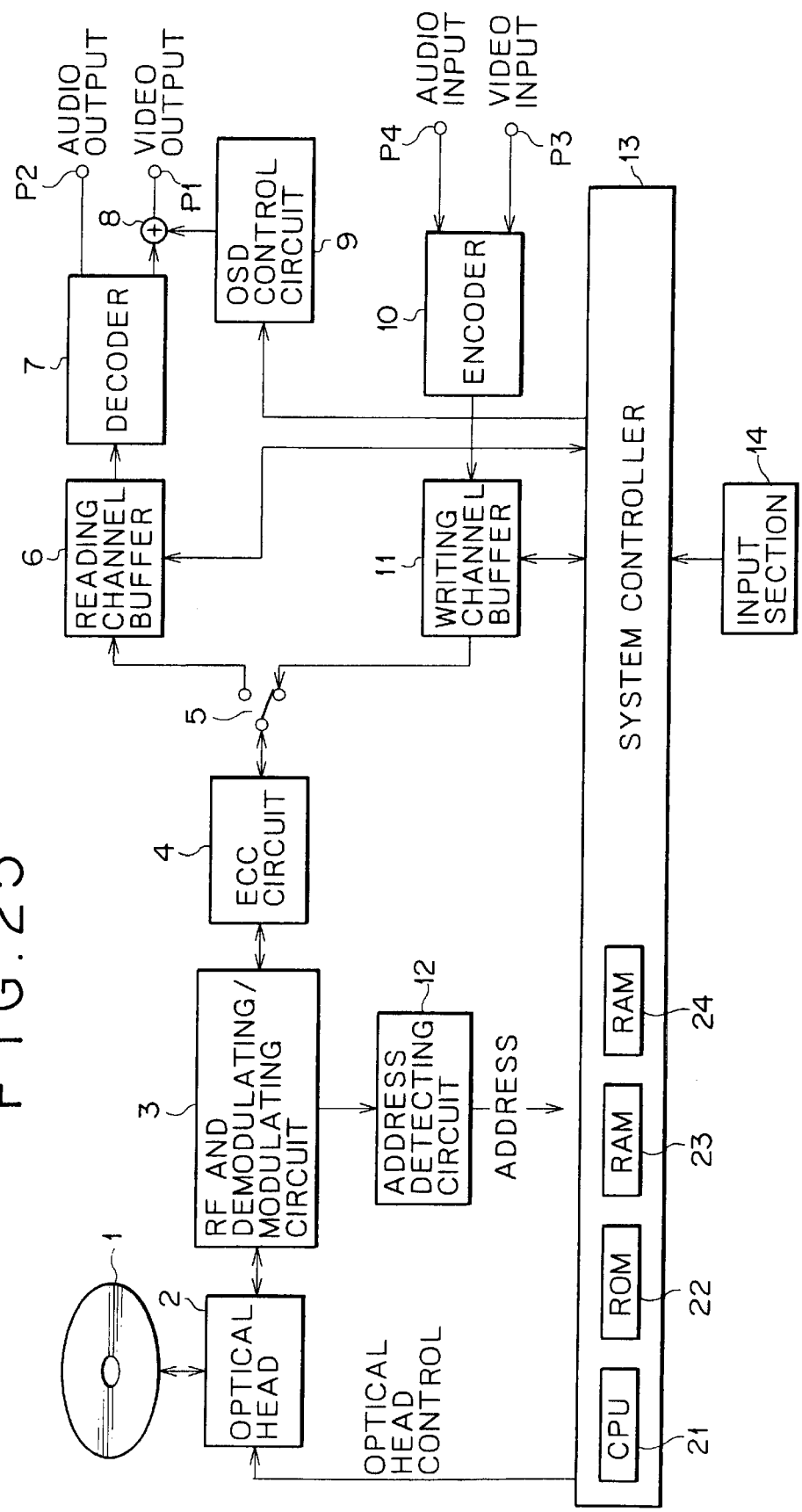
FIG. 25 is a block diagram illustrating a structural example of an optical disk apparatus to which the invention is applied.

FIG. 25 illustrates an example of configuration of an optical disk apparatus for recording or reproducing information onto or from an optical disk as a medium having the files described above. In this optical disk apparatus, an optical head 2 of one line is provided for one programmable optical disk 1, and is commonly used for both reading and writing data.

A bit stream read out of the optical disk 1, after being demodulated by an RF and demodulating/modulating circuit 3, is subjected to error correction by an ECC circuit 4, and sent via a switch 5 to a reading channel buffer 6 for absorbing any difference between the reading rate and the decoding rate. The reading channel buffer 6 is configured to be able to read and write data from and into a system controller 13.

The bit stream outputted from the reading channel buffer 6 is decoded by the decoder 7, which then outputs video signals and audio signals. The video signals supplied from the decoder 7 are entered into a synthesizing circuit 8 and, after being synthesized with video signals supplied from an on-screen display (OSD) control circuit 9, supplied from an output terminal P1 to a display unit (not shown), on which they are displayed. Audio signals supplied from the decoder 7 are delivered from an output terminal P2 to a loudspeaker (not shown) and reproduced.

On the other hand, video signals entered from an input terminal P3 and audio signals entered from an input terminal P4, after being encoded by an encoder 10, are delivered to a writing channel buffer 11 for absorbing any difference between the encoding rate and the writing rate. This writing channel buffer 11, too, is configured to be able to read and write data from and into a system controller 13.

Data accumulated in the writing channel buffer 11 are read out of the writing channel buffer 11, entered via the switch 5 into the ECC circuit 4, where they undergo the addition of an error correction code, and demodulated by the RF and demodulating/modulating circuit 3. Signals outputted from the RF and demodulating/modulating circuit 3 (RF signals) are written into the optical disk 1 by the optical head 2.

An address detecting circuit 12 detects address information on the track for recording or reproduction on the optical disk 1. The system controller 13, intended for control of the operations of different sections of this optical disk apparatus, comprises a CPU 21 for performing various controls, a ROM 22 in which processing programs and the like to be executed by the CPU 21 are stored, a RAM 23 for temporarily storing data and the like generated in the course of processing, and a RAM 24 for recording or reproducing various information files into or out of the optical disk 1. The CPU 21 performs fine adjustment of the position of the optical head 2 on the basis of the detection result of the address detecting circuit 12. The CPU 21 also controls the changing over of the switch 5. An input section 14 consisting of various switches and buttons is manipulated by the user when various commands are to be entered.

Next will be described the basic operation to read an information file. For instance, when the"VOLUME.TOC" information file is to be read, the CPU 21 of the system controller 13, using a file system manipulation command incorporated in advance into its processing program, determines a physical address on the optical disk 1 where the"VOLUME.TOC" is recorded and its length. Then the CPU 21 shifts the optical head 2 to its read position on the basis of this address information on "VOLUME.TOC." The CPU 21 sets the optical head 2, the RF and demodulating/modulating circuit 3 and the ECC circuit 4 in the read mode, changes over the switch 5 toward the reading channel buffer 6 and, after fine adjustment of the position of the optical head 2, causes the optical head 2 to start reading. The contents of "VOLUME.TOC" are thereby read by the optical head 2, demodulated by the RF and demodulating/modulating circuit 3 and, after undergoing error correction by the ECC circuit 4, accumulated in the reading channel buffer 6.

When the quantity of data accumulated in the reading channel buffer 6 has become equal to or greater than the size of "VOLUME.TOC," the CPU 21 causes the read operation to be stopped. After that, the CPU 21 reads pertinent data from the reading channel buffer 6, and stores them into the RAM 24.

Next, the basic operation to write an information file will be described, with a case of writing the "VOLUME.TOC" information file being taken up as an example. The CPU 21, using a file system manipulation command incorporated in advance into its processing program, searches for a vacant area as large as or larger than the "VOLUME.TOC" to be written, and determines its address.

Next the CPU 21 transfers to the writing channel buffer 11 the "VOLUME.TOC" to be newly written, made ready in the RAM 24. Then the CPU 21 shifts the optical head 2 to the write position on the basis of the address information on the vacant area. The CPU 21 sets the optical head 2, the RF and demodulating/modulating circuit 3 and the ECC circuit 4 in the write mode, switches the switch 5 toward the writing channel buffer 11 and, after fine adjustment of the position of the optical head 2, causes the optical head 2 to start writing.

Newly readied contents of "VOLUME.TOC" are thereby read out of the reading channel buffer 11 and, after undergoing error correction by the ECC circuit 4, demodulated by the RF and demodulating/modulating circuit 3. Signals supplied from the RF and demodulating/modulating circuit 3 are recorded onto the optical disk 1 by the optical head 2. When the quantity of data read out of the writing channel buffer 11 and recorded on the optical disk has become equal to the size of "VOLUME.TOC," the CPU 21 causes the write operation to be stopped.

Finally, the CPU 21, using a file system manipulation command incorporated in advance into its processing program, updates the pointer to "VOLUME.TOC" in a file system (the optical disk 1) to make it point to the newly written position.

Next, the basic operation for stream reproduction will be described, with a case of reproducing the CHUNK__0001.MPEG2 of FIG. 1 being taken up as an example. The CPU 21, using a file system manipulation command incorporated in advance into its processing program, determines a physical address on the optical disk 1 where the "CHUNK__0001.MPEG2" is recorded and its length. Then the CPU 21 shifts the optical head 2 to its read position on the basis of this address information on "CHUNK__0001.MPEG2." The CPU 21 sets the optical head 2, the RF and demodulating/modulating circuit 3 and the ECC circuit 4 in the read mode, switches the switch 5 toward the reading channel buffer 6 and, after fine adjustment of the position of the optical head 2, causes the optical head 2 to start reading.

The contents of "CHUNK__0001.MPEG2" read by the optical head 2 are accumulated in the reading channel buffer 6 via the RF and demodulating/modulating circuit 3, the ECC circuit 4 and the switch 5. The data accumulated in the reading channel buffer 6 are supplied to the decoder 7, which decodes them and outputs video signals and audio signals. The audio signals are supplied from the output terminal P2, while the video signals are supplied from the output terminal P1 via the synthesizing circuit.

When the quantity of data read out of the optical disk 1, decoded and displayed has become equal to the size of "CHUNK__0001.MPEG2" or a stop to the read operation is instructed from the input section 14, the CPU 21 causes the read operation and decoding to be stopped.

Next the basic operation for stream recording will be described, with a case of recording the "CHUNK__0001.MPEG2" of FIG. 1 being taken up as an example. The CPU 21, using a file system manipulation command incorporated in advance into its processing program, searches for a vacant area as large as or larger than the "CHUNK__0001.MPEG2" to be written, and determines its address.

Video signals entered from the input terminal P3 and audio signals entered from the input terminal P4, after being encoded by the encoder 10, are accumulated in the writing channel buffer 11. Then the CPU 21 shifts the optical head 2 to its write position on the basis of address information on the vacant area. The CPU 21 sets the optical head 2, the RF and demodulating/modulating circuit 3 and the ECC circuit 4 in the write mode, switches the switch 5 toward the writing channel buffer 11 and, after fine adjustment of the position of the optical head 2, causes the optical head 2 to start writing. This causes the newly prepared contents of "CHUNK__0001.MPEG2" to be read out of the writing channel buffer 11, entered into the optical head 2 via the switch 5, the ECC circuit 4 and the RF and demodulating/modulating circuit 3, and recorded onto the optical disk 1.

When the quantity of data read out of the writing channel buffer 11 has become equal to a preset value, or a stop to the write operation is instructed from the input section 14, the CPU 21 causes the write operation and decoding to be stopped. Finally the CPU 21, using a file system manipulation command incorporated in advance into its processing program, updates the pointer to "CHUNK__0001.MPEG2" in a file system (the optical disk 1) to make it point to the newly written position.

It is now supposed that such information files and stream files as shown in FIG. 26 are recorded on the optical disk 1. In this example one program file named "PROGRAM__001.PGI" is included. Further, this optical disk 1 include three title files respectively named "TITLE__001.VDR," "TITLE__002.VDR" AND "TITLE__003.VDR."

This optical disk 1 also includes two chunkgroup files named "CHUNK__001.CGIT" and CHUNK__002.CGIT. This optical disk 1 further includes three stream files named "CHUNK__0001.MPEG2," "CHUNK__0011.MPEG2" and "CHUNK__0012.MPEG2," while three information files named "CHUNK__0001.ABST," "CHUNK__0011.ABST" and "CHUNK__0012.ABST" are placed therein as pieces of information respectively matching them.

Figure 27:
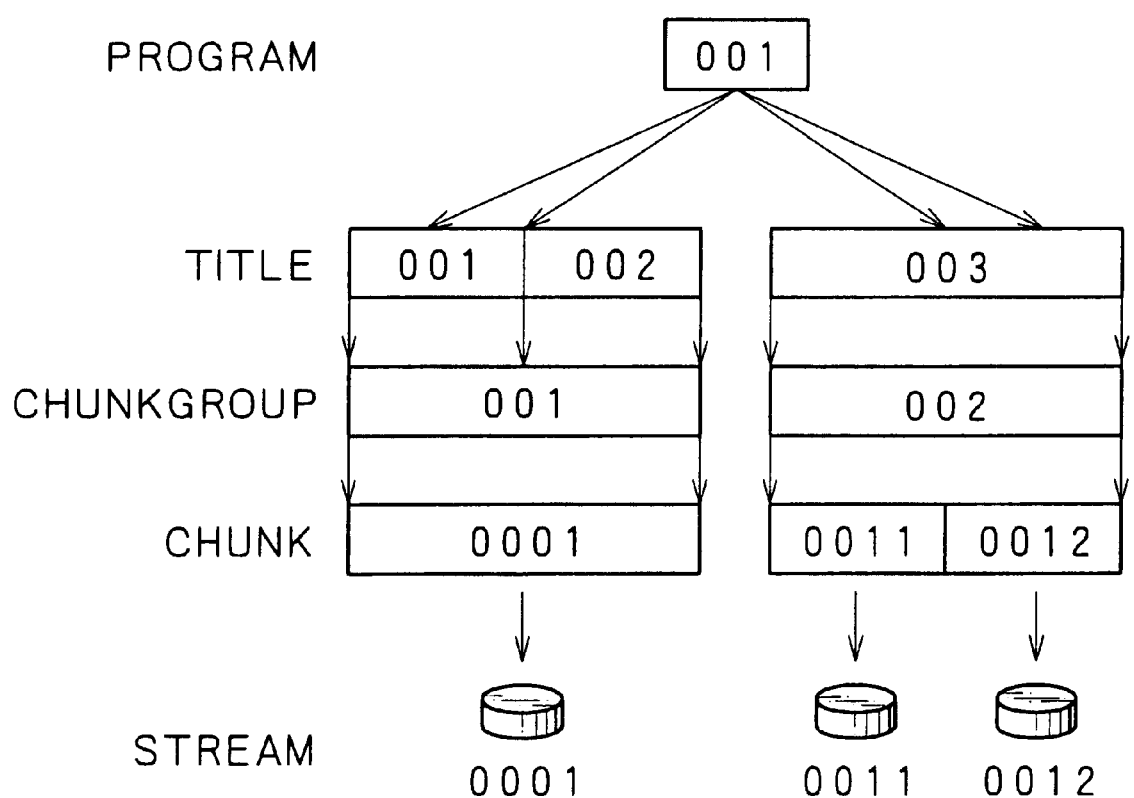
FIG. 27 is a diagram for explaining the logical structure of the directory.

The logical structure of the optical disk having the information files and the stream files shown in FIG. 26 is illustrated in FIG. 27. In this instance, the chunk information file "CHUNK__0001.ABST" designates the stream file "CHUNK__0001. MPEG2," the chunk file CHUNK__0011.ABST" designates the stream file "CHUNK__0011.MPEG2," and the chunk file "CHUNK__0012.ABST" designates the stream file "CHUNK__0012.MPEG2." More specifically, the file ID of the stream is designated in the chunk__file__id field of CHUNK__%%%%.ABST of FIG. 24.

Further in this instance, the chunk group information file "CHUNK__0001.CGIT" designates the chunk information file "CHUNK__0000.ABST" and the chunk group information file "CHUNK__002.CGIT" designates the chunk information files "CHUNK__0011.ABST" and "CHUNK__0012.ABST." More specifically, the file ID of the chunk information is designated in the chunk__file__id field of the chunk__arrangement__info ( ) of FIG. 23. This chunk__arrangement__info ( ) is in the chunk group information file, and the data structure is such that there are as many sets of chunk__arrangement__info ( ) as chunks belonging to the pertinent chunk group (the chunk__arrangement__info ( ) of FIG. 23 is stated in the chunk__connection__info ( ) of FIG. 22, and this chunk__connection__info ( ) is stated in the CHUNKGROUP__###.CGIT of FIG. 21).

In CHUNKGROUP_001, there is only one set of chunk_arrangement_info ( ), in which chunk_info_file_id designates CHUNK_001. CHUNKGROUP_002 has two sets of chunk_arrangement_info ( ), in which CHUNKGROUP_0011 and CHUNKGROUP_0012 are respectively designated. This being he case, a chunk group can designate the reproducing sequences and the like of a plurality of chunks.

More specifically, first, the initial value of a clock in the pertinent chunk group is determined by chunkgroup_time_base_offset in the CHUNKGROUP_###.CGIT of FIG. 21. Next, when each chunk is to be registered, presentation_start_cg_count and presentation_end_cg_time_count of chunk_arrangement_info ( ) in FIG. 23 are designated.

Figure 28:
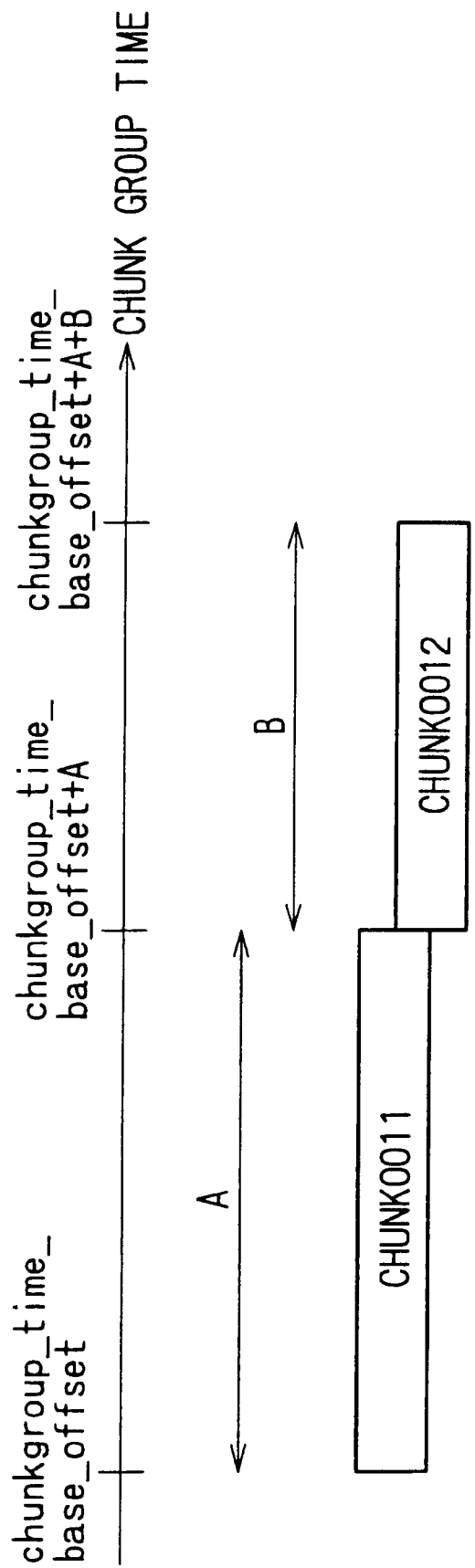
FIG. 28 is a diagram for explaining offset.

For instance, as in FIG. 28, the (time) length of CHUNK_0011 is represented by A, and that of CHUNK_0012, by B. The presentation_start_cg_count of CHUNKG_0011 is equal to chunkgroup_time_base_offset, and presentation_end_cg_count is equal to chunk_group_time_base_offset+A. Also, the presentation_start_cg_count of CHUNKG_0012 is equal to chunk_group_time_equal to chunkgroup_time_base_offset+A+B. Under this setting, CHUNKGROUP_0012 can be defined to be the outcome of consecutive reproduction of CHUNK_0011 and CHUNK_0012.

Incidentally, where the reproduction times of CHUNK_0011 and CHUNK_0012 overlap each other, it is possible to specify a corresponding shift in time. It is also possible to make a statement in the transition_info ( ) in the chunk_arrangement_info ( ) of FIG. 23, special effects (including fade-in, fade-out and wipe) can be designated in a transition between two streams.

In the example of FIG. 26 (FIG. 27), the title information files "TITLE_001.VDR" and "TITLE_002.VDR" designate the chunk group information file "CHUNKGROUP_001.CGIT," and the title information file "TITLE_003.VDR" designates the chunk group information file "CHUNKGROUP_002.CGIT." More specifically, in the title_info ( ) of FIG. 16, a file ID of a chunk group is designated in a field named cgit_file_id, and the time range in which pertinent titles within a chunk group are designated in fields named title_start_chunk_group_time_stamp and title_end_chunk_group_time_stamp.

For instance in the example of FIG. 27, TITLE_001 and TITLE_002 respectively point to the former and latter halves of CHUNKGROUP_001. Incidentally, this division has been made to meet a requirement from the user, and its position can be selected as the user prefers, but need not be predetermined. Now it is supposed that, the position of division by TITLE_001 and TITLE_002 is limited to a position away by A from the leading position of CHUNKGROUP_001.

TITLE_001 designates CHUNKGROUP_001 as the chunk group, the start time of CHUNKGROUP_001 as the start time of the title, and the time at a user_specified point as the end time of the title.

Thus, chunkgroup_time_base_offset (leading position) of CHUNKGROUP_001 is set as title_start_chunk_group_time_stamp of TITLE_001, and chunkgroup_time_base_offset of CHUNKGROUP_001 plus the length of A is set as title_end_chunk_group_time_stamp of TITLE_001.

Similarly, TITLE_002 designates CHUNKGROUP_001 as the chunk group, the time at a user-specified point as the start time of the title, and the end time of CHUNKGROUP_001 as the end time of the title.

Thus, chunkgroup_time_base_offset (leading position) of CHUNKGROUP_001 plus the length of A is set as title_start_chunk_group_time_stamp of TITLE_002, and chunkgroup_time_base_offset of CHUNKGROUP_001 plus the length of CHUNKGROUP_001 is set as title_end_chunk_group_time_stamp of TITLE_002.

Further, TITLE_003 designates CHUNKGROUP_002 as the chunk group, the start time of CHUNKGROUP_002 as the start time of the title, and the end time of CHUNKGROUP_002 as the end time of the title.

Thus, chunkgroup_time_base_offset (leading position) of CHUNKGROUP_003 is set as title_start_chunk_group_time stamp of TITLE_003, and chunkgroup_time_base_offset of CHUNKGROUP_002 plus the length of CHUNKGROUP_002 is set as title_end_chunk_group_time_stamp of TITLE_003.

Further in this example, the program information file "PROGRAM_PP1.PGI" specifies that part of TITLE_001 and part of TITLE_003 be reproduced in this order. More specifically, one cut is singled out by designating the title by title_number in play_itme( ) of FIG. 20 and defining the start and end points by the times defined by title. By putting together a plurality of such cuts, a program is composed.

Next will be described the operation to additionally record (append-record) new information to the optical disk 1. More specifically, this recording is accomplished by, for instance, setting the timer appropriately or the user's manipulation of the input section 14 to instruct the optical disk apparatus to perform recording on a real time basis. In the latter case, if the recording button is pressed, the end time of recording cannot be predicted, but if the button for the one_touch recording function (a function to continue recording for a certain period of time after the manipulation), it is predictable.

Here is described a pre-timed recording procedure by way of example. In this case, it is supposed that the user of the optical disk apparatus designates in advance the start and end times of recording, the bit rate of the bit stream and the channel on which the recording is to be done among other things. It is also supposed that, at the time the user made a recording reservation, the presence of a sufficient unused capacity for the desired bit rate and recording duration was confirmed in advance.

If another recording is done on the optical disk 1 between the time of recording reservation and that of recording execution, a sufficient capacity for recording the program, of which recording is reserved, at the designated bit rate may become unavailable. In such a case, the CPU 21 will either reduce the bit rate from its specified level to enable information for the reserved duration to be recorded or keep the bit rate as designated and let recording be done only as long as possible. In this case, needless to mention, as soon as that other recording has been done to adversely affect the recording reservation, the CPU 21 issues a message to notify the user of this problem.

Now, when the start time of the scheduled recording nears, the CPU 21 uses a timer and a clock built into it to automatically return to the active mode from the sleep mode. The CPU 21 then uses a file system manipulation command incorporated in advance into its processing program to secure a sufficient area on the optical disk 1 to record the reserved program. Thus, as the remainder of the subtraction of the start time from the end time of the scheduled recording (recording duration) multiplied by the bit rate is the size of the area required for recording the specified program, the CPU 21 first secures an area of this size. If, in recording this program, any other information file than the stream file, such as a title information file for registration of a new title for instance, needs to be recorded, a capacity for recording such an information file or files should also be secured on the optical disk 1. If a large enough area cannot be secured, the problem will be addressed by one of the above-cited alternatives (including a change in bit rate and recording only as long as the available capacity allows).

Incidentally, as a new title is to be recorded, the user assigns a new file name to the new stream file in a new stream directory. Here, this is supposed to be ¥MPEGAV¥STREAMS_003¥CHUNK_0031. Thus, as shown in FIG. 29, the file is named CHUNK_0031.MPEG2under the STREAM_003 directory under the MPEGAV directory under the root directory.

The CPU 21 orders each section to execute the recording mode. For instance, video signals inputted from a tuner (not shown) to the input terminal P3 and audio signals inputted to the input terminal P4, after being encoded by the encoder 10, are accumulated in the writing channel buffer 11. Then the CPU 21 shifts the optical head 2 to the write position on the basis of address information on the earlier secured area. The CPU 21 sets the optical head 2, the RF and demodulating/modulating circuit 3 and the ECC circuit 4 in the write mode, changes over the switch 5 toward the writing channel buffer 11 and, after fine adjustment of the position of the optical head 2, causes the optical head 2 to start writing. This causes the newly prepared contents of "CHUNK_0031.MPEG2" to be read out of the writing channel buffer 11, and recorded onto the optical disk 1 via the switch 5, the ECC circuit 4, the RF and demodulating/modulating circuit 3 and the optical head 2.

Continuing the write operation described above, the CPU 21 causes the write operation to be stopped when any one of the following conditions is met:

1) The end time of the scheduled recording has arrived;
2) It is made impossible to record on the optical disk by a capacity shortage or any other cause; or
3) An instruction is given to stop recording.

Next the CPU 21, using a file system manipulation command incorporated in advance into its processing program, updates the pointer to "CHUNK_0031.MPEG2" in a file system to make it point to the newly written position. The CPU21 also makes ready a file for each of chunk information, chunkgroup information and title information, and records the files with appropriate names assigned to them. To add, it is necessary, at the time of recording or making a reservation for recording, to secure a sufficient vacant capacity on the optical disk 2 to record these files.

In this manner, a new information file is prepared, e.g. as illustrated in FIG. 30. In the figure, the file names with an asterisk (*) denote the newly prepared files.

Figure 31:
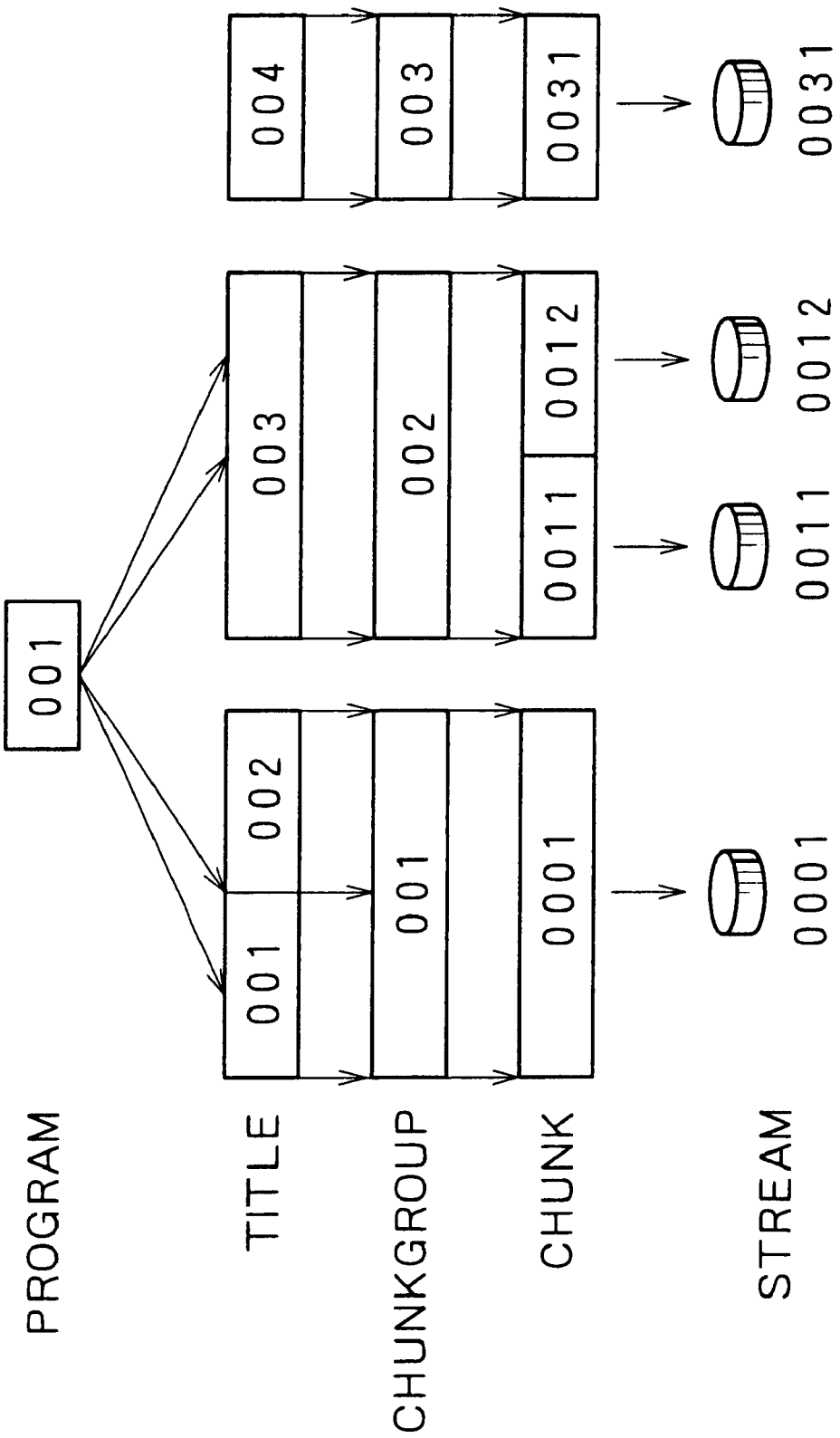
FIG. 31 is a diagram for explaining the logical structure of a directory.

FIG. 31 shows the relationships among the newly created information files. TITLE_004 designates CHUNKGROUP_003, CHUNKGROUP_003 designates CHUNK_0031 and CHUNK_0031 designates STREAM_0031.

Thus, the new stream is registered in an information file as TITLE_004. The user can know the attributes and other features of TITLE_004 by using the title checking function of the optical disk apparatus, and can also reproduce TITLE_000.

Next will be described the operation to accomplish overwrite recording on the optical disk 1 illustrated in FIG. 26 (FIG. 27). Overwrite recording means, as in the case of recording signals on a videotape, recording a program over an earlier recorded program (which is thereby deleted).

In overwrite recording, there are a number of options regarding the sequence of carrying out actual recording to fill an available capacity. The first conceivable option is to record in the order of streams designated by titles. Thus, in the present case, recording is started with the leading edge of STREAM_0011 and, when the end of STREAM_0011 has been recorded, recording is continued from the leading edge of STREAM_0012 onward, followed by recording in a vacant area when the end of STREAM_0012 has been recorded. When the recording in the vacant area has exhausted the unoccupied space, recording is continued over an existing stream.

The former method is superior in that it emulates videotaping. Thus, as it is similar to recording on a videotape, this method can be readily understood by the user. The latter is superior in respect of protection of existing recordings because their deletion is deferred.

Furthermore, if another recording is made on the optical disk 1 between the time of recording reservation and that of executing the reservation, it may become impossible to secure a sufficient capacity to record the reserved program at the specified bit rate. In such a case, as in the above-cited instance, either the bit rate is automatically reduced to record the program for the whole reserved duration or the bit rate is kept as it is and recording is done as long as the available capacity allows.

When the scheduled start time of reserved recording nears, the optical disk apparatus returns to the active mode from the sleep mode. The CPU 21 secures the whole unoccupied capacity on the optical disk 1. Obviously, there is an alternative not to secure the unoccupied capacity at this point of time but to secure it when it has become necessary, but it is supposed here, for the sake of convenience of description, to secure the required capacity before the start of recording.

If, for pre-timed recording or the like, the size of the required area is known in advance because the start and end times and the bit rate are specified, only the required capacity (perhaps plus a safety margin) may be secured. If any information file is to be recorded in connection with the program recording, for instance a title information file and the like are needed to register a new title, the secured capacity should be large enough to allow the recording of these information files and the like as well.

Here it is supposed that the file name of a new stream file is assigned to the new stream file in a new stream directory. The file name is ¥MPEGAV¥STREAMS_002¥CHUNK_0031 here. Thus, as shown in FIG. 32, the file is named CHUNK_0031.MPEG2under the STREAM_002 directory under the MPEGAV directory under the root directory.

Video signals inputted to the input terminal P3 and audio signals inputted to the input terminal P4, after being encoded by the encoder 10, are accumulated in the writing channel buffer 11. Then the CPU 21 shifts the optical head 2 to the write position on the basis of address information on the earlier secured area. The CPU 21 sets the optical head 2, the RF and demodulating/modulating circuit 3 and the ECC circuit 4 in the write mode, changes over the switch 5 toward the writing channel buffer 11 and, after fine adjustment of the position of the optical head 2, causes the optical head 2 to start writing. This causes the newly prepared contents of "CHUNK_0031.MPEG2" to be read out of the writing channel buffer 11, and recorded onto the optical disk 1 via the switch 5, the ECC circuit 4, the RF and demodulating/modulating circuit 3 and the optical head 2.

At this time, the stream file "CHUNK_0011.MPEG2" is first updated. When recording has been completed until the end of "CHUNK_0011.MPEG2," the recording operation proceeds to "CHUNK_0012.MPEG2" and further to "CHUNK_0031.MPEG2."

Continuing the write operation described above, the CPU 21 causes the write operation to be stopped when any one of the three conditions is met as in the above cited case.

Next the CPU 21, using a file system manipulation command incorporated in advance into its processing program, updates stream files, chunk information, chunk-group information and title information.

Incidentally, depending on the timing of writing completion, the file configuration may change. For instance, if recording is done on "CHUNK_0031.MPEG2" after the completion of overwriting of two streams, CHUNK_0011.MPEG2 and CHUNK_0012.MPEG2, the file configuration on the optical disk 1 will be as illustrated in FIG. 33. The file names with an asterisk (*) denote the newly prepared files.

Figure 34:
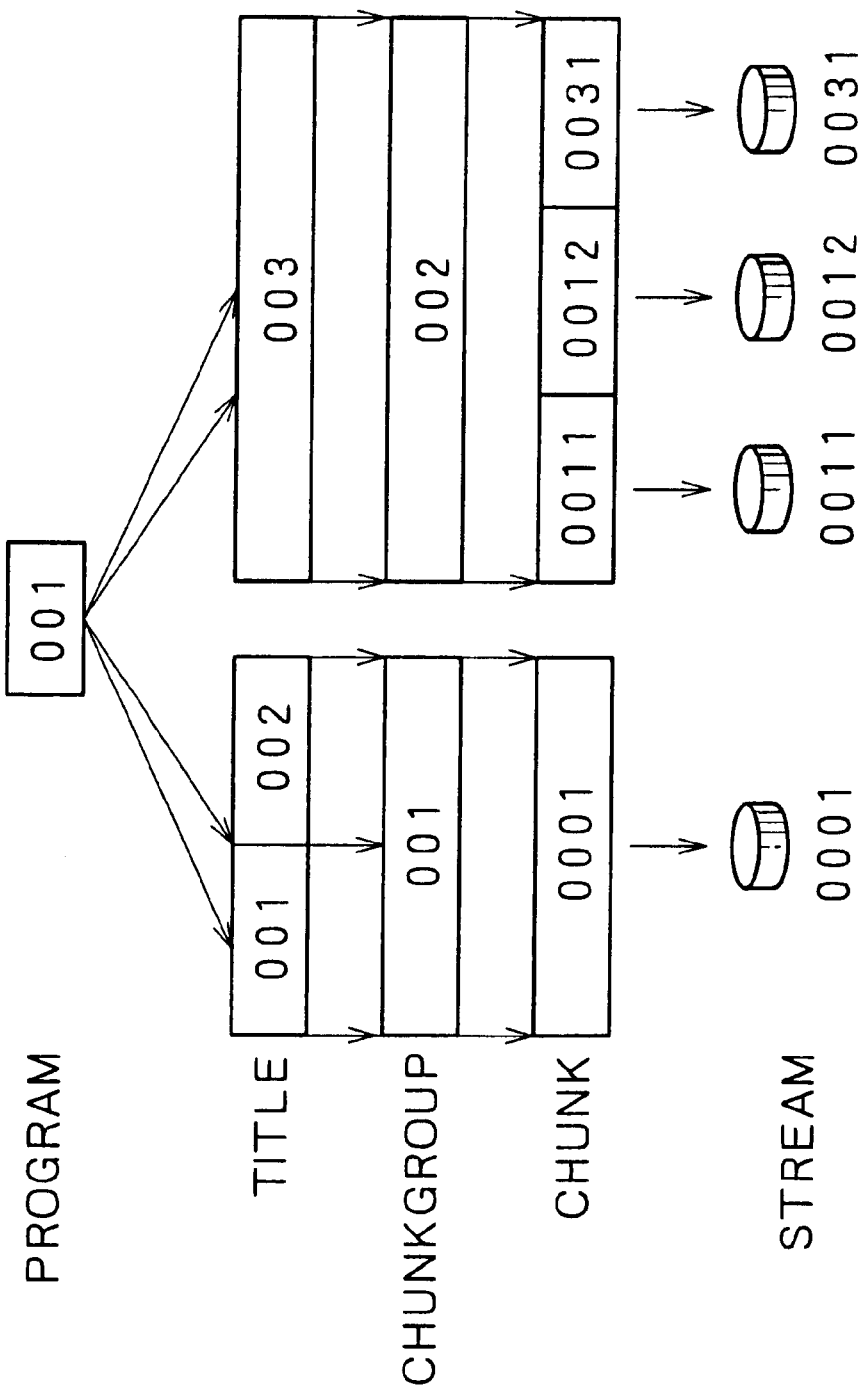
FIG. 34 is a diagram for explaining the logical structure of a directory.

FIG. 34 shows the relationships among the newly created information files (files in FIG. 33). As comparison with FIG. 31 would readily reveal, CHUNK_0031 is additional as a CHUNK included in CHUNKGROUP_003 designated by TITLE_003, and CHUNK_0031 designates STREAM_0031.

Figures 35, 36, 37:
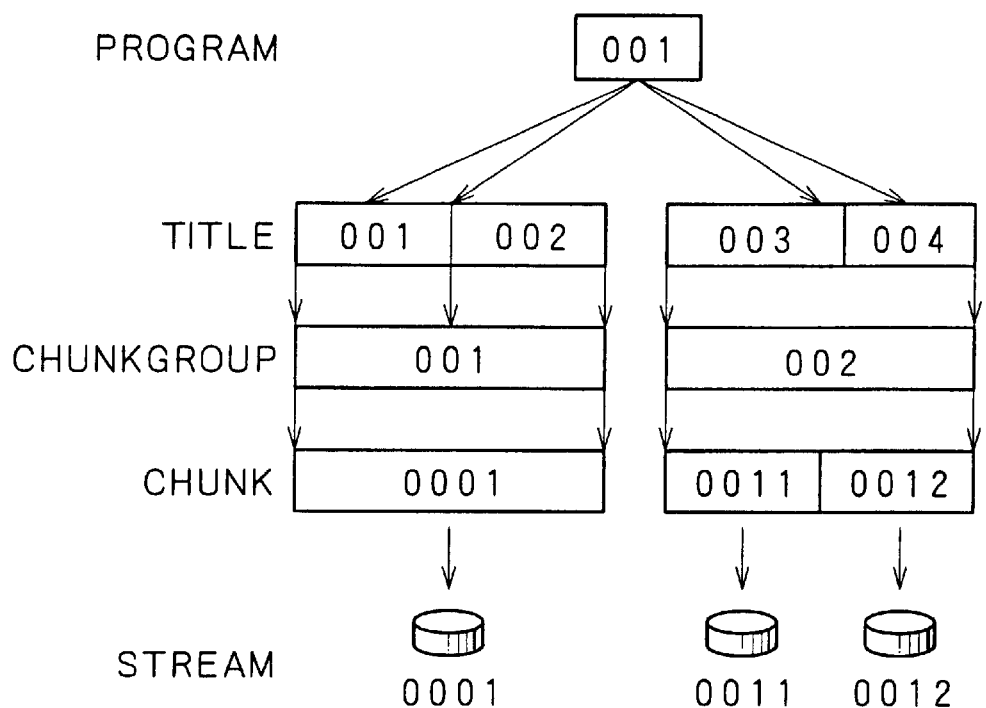
FIG. 35 is a diagram for explaining the logical structure of a directory.
FIG. 36 is a diagram for explaining title_playback_mode_flag ( )
FIG. 37 is a diagram for explaining program_playback_mode_flag ( )

On the other hand, if writing over an existing stream ends uncompleted, for instance overwrite recording ends on the way of recording CHUNK_0011, the CHUNK_0031 stream secured for overwriting is released because the overwriting is abandoned. In this case, titles are processed in a specific way. Thus, overwrite recording is started from the leading edge of TITLE_003 and, if the recording is ended on the way, the title is divided then. As shown in FIG. 35, a new title TITLE_003 is assigned to the portion from the start position of overwrite recording to the end position, and the portion after that (the remaining portion of the original TITLE_003) is named TITLE_004.

Next will be described the operation for title reproduction. It is now supposed that an optical disk 1 having such files as are shown in FIG. 26 is inserted into the optical disk apparatus, and titles are to be reproduced. First, when the optical disk is inserted, the CPU 21 reads information files from the optical disk 1, and stores them into the RAM 24. This operation is accomplished by repeating the basic operation to read information files.

The CPU 21 first reads VOLUME.TOC and ALBUM.STR. Next the CPU 21 checks how many files having an extension ".VDR" under the directory "TITLE" there are. A file having this extension is a file containing title information, and the number of such files is equal to that of titles. In the example of FIG. 26, the number of titles is 3. Next, the CPU 21 reads 3 title information files and stores them into the RAM 24.

The CPU 21 controls the OSD control circuit 9 to generate character information representing title information recorded on the optical disk 1, causes the synthesizing circuit 8 to synthesize the information with video signals, and causes the synthesized signals to be supplied from the output terminal P1 to have them displayed. In the present case, the existence of three titles and the length and attributes (name, date and hour of recording, and the like) of each of the three titles are displayed.

Here it is supposed that the user specifies reproduction of, e.g., TITLE_002. In an information file of TITLE_002 (in cgit_file_id of title_info ( ) in FIG. 16), a file ID specifying CHUNKGROUP_001 is recorded, and the CPU 21 memorizes it and stores CHUNKGROUP_001 into the RAM 24.

Next, the CPU21 what CHUNK each of the start time and the end time (title_start_chunk_group time_stamp and the title_end_chunk_group_time_stamp in title_info ( ) of FIG. 16) matches. This is accomplished by comparing the sets of information in which each CHUNK is registered (presentation_start_cg_time_count and presentation_end_cg_time_count in chunk_arrangement_info ( ) of FIG. 23). In the present case, as illustrated in FIG. 27, it is seen that the start time of TITLE_002 is on the way of CHUNK_0001. Thus, it is found out that, in order to reproduce TITLE_002 from the beginning, reproduction can be started from the middle of a stream file "CHUNK_0001.MPEG2."

Next, the CPU 21 checks what position in a stream the leading edge of TITLE_002 corresponds to. Thus, calculation is made to find out which offset time (time stamp) in the stream the start time of TITLE_002 corresponds to and next, by using characteristic point information in the CHUNK file, the reproduction start time immediately before the start time is identified. The offset distance from the file leading edge, which is the start point of reproduction, is thereby determined.

Then the CPU 21, using a file system manipulation command incorporated in advance into its processing program, determines a physical address on the optical disk 1 where the "CHUNK_0001.MPEG2" is recorded and its length. The offset address of the reproduction start point found out as described above is added to this address, and the address of the reproduction start point of TITLE_002 is thereby finalized.

Then the CPU 21 shifts the optical head 2 to its read position on the basis of this address information on "CHUNK_0001.MPEG2." The CPU 21 sets the optical head 2, the RF and demodulating/modulating circuit 3 and the ECC circuit 4 in the read mode, switches the switch 5 toward the reading channel buffer 6 and, after fine adjustment of the position of the optical head 2, causes the optical head 2 to start reading. The contents of "CHUNK_0001.MPEG2" are thereby accumulated in the reading channel buffer 6.

The data accumulated in the reading channel buffer 6 are supplied to the decoder 7 to undergo decoding, and video signals and audio signals are supplied. When the quantity of data read out of the optical disk 1, decoded and displayed becomes equal to the size of "CHUNK_0001.MPEG2", the CPU 21 shifts to reproduction of TITLE_003. The operation to reproduce this TITLE_003 is the same as that to reproduce TITLE_002.

When the reproduction of the registered title or an instruction is given to stop reading, reading and decoding are discontinued.

To add, when a new disk is inserted into the optical disk apparatus as the optical disk 1 or a disk of a wrong format is inserted, the CUP 21 will try to read VOLUME.TOC and ALBUM.STR upon insertion of the disk, but no such files will be present on the disk. In such a case, i.e. when it is impossible to read VOLUME.TOC and ALBUM.STR, the CPU 21 will output a message to seek an instruction from the user. The user will instruct the CPU 21 to eject the optical disk 1 (if, for instance, it is a disk of a wrong format), to initialize it (if, for instance, it is a new disk of the right format) or to restore the data somehow (if, for instance, the desired data on a disk of the right format are destroyed).

Further explanation of each field in volume_attribute ( ) in FIG. 4 will follow. Of these fields, volume_attribute_length is a field in which information on the length of this volume_attribute ( ) expressed in bytes is stated. The vdr_version field is where is stated information indicating the version of the VDR Application Layer Format to which conforms the logical volume, where this volume_attribute ( ) is present. Herein, 4 digit numerals are expressed in a bed of 4 bits per digit.

The title_playback_mode_flag field is where a flag to set the method of title reproduction is stated. As illustrated in FIG. 36, "1" on this flag means a continuous play mode, in which the CPU 21, upon ending of the reproduction of a designated title, continues to play the next title in accordance with the sequence of title numbers, while "0" on this flag means a single play mode, in which the CPU 21 stops reproduction upon ending of the reproduction of a designated title.

The program_playback_mode_flag field is where a flag to set the method of program reproduction is stated. As illustrated in FIG. 37, "1" on this flag means a consecutive play mode, in which the CPU 21, upon ending of the reproduction of a designated program, continues to play the next program in accordance with the sequence of program numbers, while "0" on this flag means a single play mode, in which the CPU 21 stops reproduction upon ending of the reproduction of a designated program.

The volume_play_time ( ) field is where the total duration of normal reproduction of all the titles present in this volume is stated, and the duration of program reproduction is not included here. In this volume_play_time ( ) is stated time_period ( ) for stating the time.

The update_time_count field is where records and the frequency of updating (not very exact) of VOLUME.TOC are stated.

The maker_id field is where the last updated maker code of the apparatus is stated, expressed in a sequence of 16 characters conforming to ISO 646.

The model_code field is where the last updated model number of the apparatus is stated, expressed in a sequence of 16 characters conforming to ISO 646.

The POSID field is where catalog numbers including POS Code are stated, and used on a ROM disk or a commercially available disk.

Figure 38:
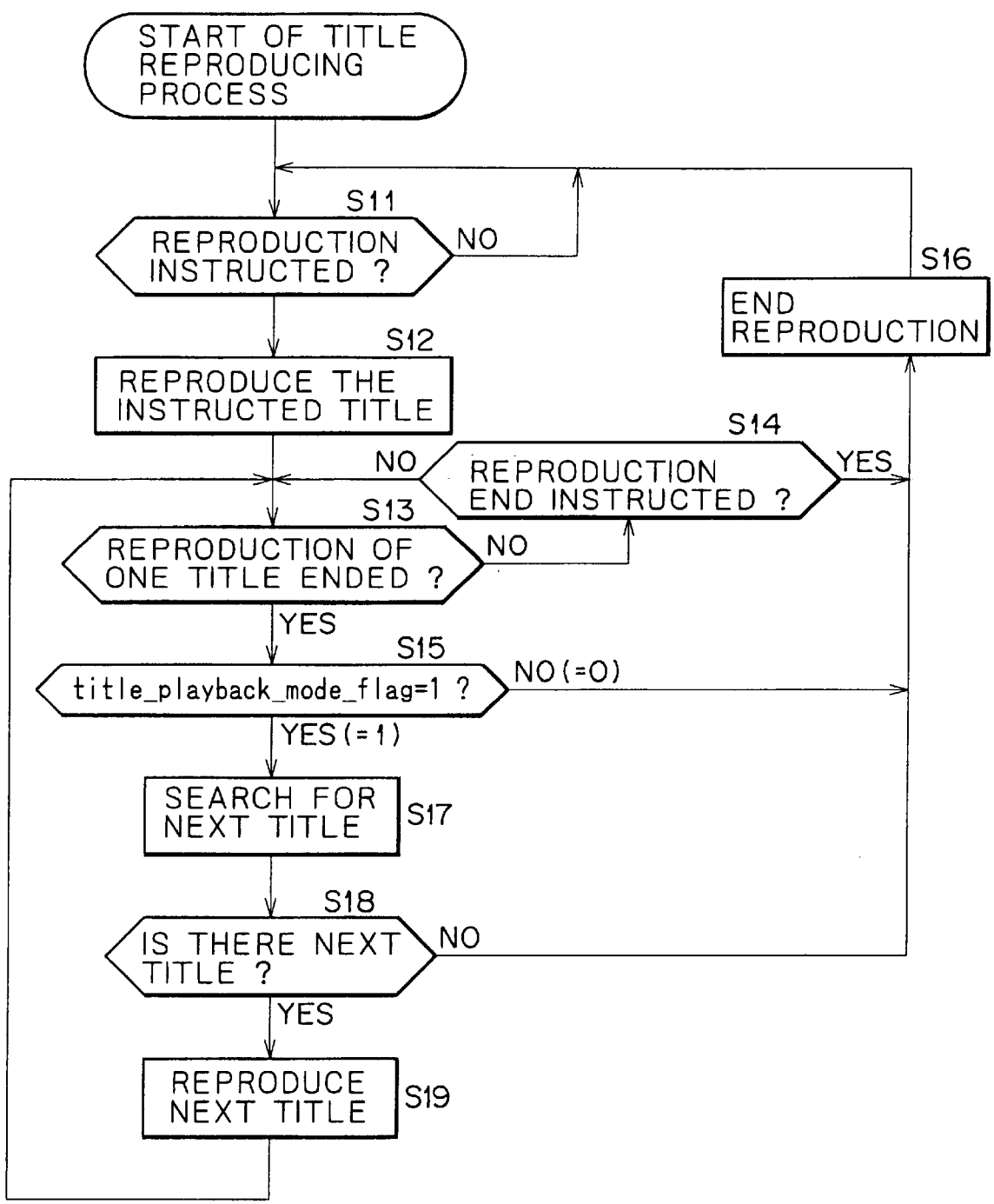
FIG. 38 is a flowchart for explaining the title reproduction process.

Next will be described, with reference to the flowchart of FIG. 38, a case of operation where a title is to be reproduced by utilizing title_playback_mode_flag. First, at step S22, the CPU 21 judges whether or not the user has instructed reproduction by manipulating the input section 14 and, if not, waits until an instruction is given. If it is judged at step S11 that reproduction has been instructed, the CPU 21 will move on to step S12 to cause the reproduction of the title, which the user has designated by manipulating the input section 14, to be started. This, as described above, causes the information reproduced from the optical disk 1 by the optical head 2 to be processed by the route of the RF and demodulating/modulating circuit 3, the ECC circuit 4, the switch 5, the reading channel buffer 6 and the decoder 7. Video data supplied from the decoder 7 are outputted from the output terminal P1 via the synthesizing circuit 8, while audio data are outputted from the output terminal P2.

Next, the CPU 21 goes on to step S13 to judge whether or not the reproduction of the pertinent title has ended. If not, at step S14 the CPU 21 judges whether or not the user has instructed to end the reproduction by manipulating the input section 14. If it is judged that the user has not instructed to end the reproduction, the CPU 21 will return to step S13, and the subsequent procedures are executed in repetition. At step 14, if it is judged that the user has instructed to end the reproduction of the prescribed title on the way, the CPU 21 will go ahead to step S16 to cause the reproduction of that title to be ended and, returning to step S11, wait until a new playback instruction is received.

If it is judged at step S13 that the reproduction of one title has been completed, the CPU 21 will proceed to step S15 to judge whether or not the title_playback_mode_flag is "1."

As described with reference to FIGS. 2 through 4, this flag is included in volume_attribute ( ), which in turn is included in volume_information ( ), which is included in VOLUME.TOC, and this VOLUME.TOC is automatically read and stored into the RAM 24 by the CPU 21 when an optical disk 1 is inserted into the optical disk apparatus. Therefore, the CPU 21 can pass judgment at step S15 according to information stored in the RAM 24.

If it is judged at step S15 that the title_playback_mode_flag is not "1" (that it is "0"), the CPU 21 will move on to step S16, ends the playback of the optical disk 1 at that point of time, returns to step S11, and shifts to a state of standby for a new playback instruction.

If it is judged at step S15 that the title_playback_mode_flag is "1," the CPU 21 will search for the next tile, and at step S18 judge whether or not the next title has been retrieved. If the next title is on the optical disk 1, the CPU 21 will move on to step S19, and causes that retrieved title to be reproduced. It then returns to step S13 to execute the subsequent procedures in repetition.

If it is judged at step S18, there is no more unreproduced title on the optical disk 1, the CPU 21 will go on to step S18, end reproduction and return to step S11.

Figure 39:
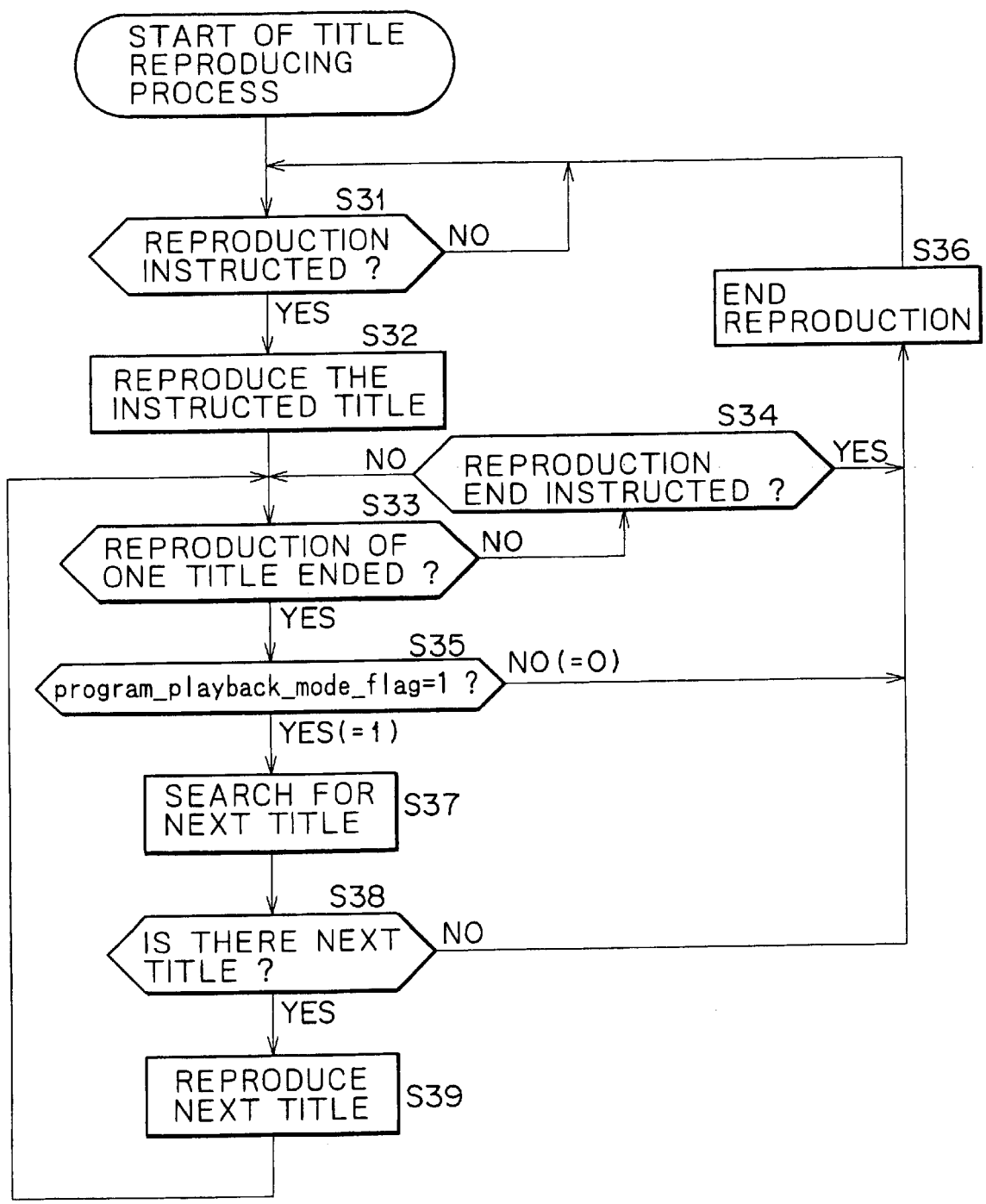
FIG. 39 is a flowchart for explaining the program reproducing process.

FIG. 39 illustrates a case in which a program is reproduced using program_playback_moda_flag. As this process from step S31 through S39 is similar to that from step S11 through S19 shown in FIG. 38, its explanation is dispensed with, but in this case, too, as in that of FIG. 38, control is effected, when the reproduction of one program has ended, as to whether reproduction of another program is to follow or reproduction is totally ended on the basis of the program_playback_mode_flag.

The user can have these flags recorded on the optical disk 1 as required. The recording is done as described earlier as the basic information file write operation.

Although the foregoing description has referred to the application of the present invention to an optical disk apparatus, the invention can also be applied to recording or reproducing information onto or from some other storage medium.

To add, as the program offering medium for offering to users a computer program to perform the above_described processing, communication media including networks and satellites can be used in addition to storage media such as magnetic disks, CD ROMs and solid memories.

As hitherto described, the reproducing apparatus, reproducing method and program offering medium according to the invention control the reproduction continuity of main information from the storage medium according to playback mode information reproduced from the storage medium, so that the storage medium can be played back always in the same condition whatever reproducing apparatus the storage medium is loaded on.

Furthermore, the storage medium according to the invention, which stores playback mode information, can permit reproduction of main information always in the same condition irrespective of the reproducing apparatus used.

What is claimed is:

1. A reproducing apparatus comprising:
  reproducing means for reproducing information including main information and playback mode information recorded on a storage medium, in which said main information represents audio and/or video data of a plurality of titles and in which said playback mode information represents one of (i) a single play mode wherein the audio and/or video data of only a single title is reproducible and (ii) a continuous play mode wherein the audio and/or video data of more than one titles are reproducible;

extracting means for extracting said playback mode information from said information defining a playback mode from the information reproduced by said reproducing means; and control means responsive to said playback mode information extracted by said extracting means for controlling the reproduction continuity of said main information from said storage medium.

2. A reproducing apparatus as claimed in claim 1, further comprising recording means for recording said playback information onto said storage medium.

3. A reproducing apparatus as claimed in claim 1, wherein:

said control means is responsive to said playback mode information for causing, when the reproduction of a prescribed part of said main information has been completed, said reproducing means either to continue to reproduce another part of main information or to discontinue reproduction.

4. A reproducing apparatus as claimed in claim 1, wherein:

said playback mode information prescribes the continuity of said main information.

5. A reproducing method for a reproducing apparatus, comprising:

a step to reproduce information comprising of playback mode information and main information recorded on said storage medium, in which said main information represents audio and/or video data of a plurality of titles and in which said playback mode information represents one of (i) a single play mode wherein the audio and/or video data of only a single title is reproducible and (ii) a continuous play mode wherein the audio and/or video data of more than one titles are reproducible;

a step to extract said playback mode information from said information defining a playback mode from the information reproduced at said reproducing step; and a step responsive to said playback mode information extracted at said extracting step to control the reproduction continuity of said main information from said storage medium.

6. A program offering medium for offering a program to execute processes comprising:

a step to reproduce information comprising of playback mode information and main information recorded on said storage medium, in which said main information represents audio and/or video data of a plurality of titles and in which said playback mode information represents one of (i) a single play mode wherein the audio and/or video data of only a single title is reproducible and (ii) a continuous play mode wherein the audio and/or video data of more than one titles are reproducible;

a step to extract said playback mode information from said information defining a playback mode from the information reproduced at said reproducing step; and a step responsive to said playback mode information extracted at said extracting step to control the reproduction continuity of said main information from said storage medium.

7. A storage medium from which main information is to be reproduced, on which is recorded:

playback mode information in accordance in which said main information represents audio and/or video data of a plurality of titles and in which said playback mode information represents one of (i) a single play mode wherein the audio and/or video data of only a single title is reproducible and (ii) a continuous play mode wherein the audio and/or video data of more than one titles are reproducible.

8. A reproducing apparatus as claimed in claim 1, wherein:

said playback mode information prescribes the combination of said main information.

* * * * *